(12) United States Patent
Nishita

(10) Patent No.: US 11,719,537 B2
(45) Date of Patent: Aug. 8, 2023

(54) LEVELING BASE, SURVEYING INSTRUMENT AND SURVEYING SYSTEM

(71) Applicant: TOPCON Corporation, Tokyo-to (JP)

(72) Inventor: Nobuyuki Nishita, Tokyo-to (JP)

(73) Assignee: TOPCON CORPORATION, Tokyo-to (JP)

( * ) Notice: Subject to any disclaimer, the term of this patent is extended or adjusted under 35 U.S.C. 154(b) by 182 days.

(21) Appl. No.: 17/385,188

(22) Filed: Jul. 26, 2021

(65) Prior Publication Data

US 2022/0034655 A1 Feb. 3, 2022

(30) Foreign Application Priority Data

Jul. 29, 2020 (JP) .................................. 2020-128329

(51) Int. Cl.
*G01C 15/00* (2006.01)
*G01S 19/01* (2010.01)

(52) U.S. Cl.
CPC .......... *G01C 15/002* (2013.01); *G01C 15/006* (2013.01); *G01S 19/01* (2013.01)

(58) Field of Classification Search
None
See application file for complete search history.

(56) References Cited

U.S. PATENT DOCUMENTS

| | | | | |
|---|---|---|---|---|
| 4,482,118 A | * | 11/1984 | Hoffmann | F16M 11/12 248/673 |
| 5,724,744 A | * | 3/1998 | Bozzo | G01C 1/00 33/291 |
| 5,949,548 A | * | 9/1999 | Shirai | G01C 1/02 250/559.38 |
| 6,453,569 B1 | * | 9/2002 | Kumagai | G01C 5/00 33/290 |
| 9,103,678 B2 | * | 8/2015 | Kumagai | G01C 15/002 |
| 10,514,464 B2 | * | 12/2019 | Lee | G01S 17/42 |
| 10,816,665 B2 | * | 10/2020 | Yoshino | G01S 17/42 |
| 10,871,370 B2 | * | 12/2020 | Ishinabe | G01S 7/4814 |

(Continued)

FOREIGN PATENT DOCUMENTS

| | | | |
|---|---|---|---|
| DE | 102020006290 A1 | * | 4/2022 |
| EP | 3660451 A1 | | 6/2020 |

(Continued)

OTHER PUBLICATIONS

European communication dated Jan. 4, 2022 in corresponding European patent application No. 21187615.6.

*Primary Examiner* — Christopher W Fulton
(74) *Attorney, Agent, or Firm* — Nields, Lemack & Frame, LLC

(57) ABSTRACT

A leveling base includes the leveling base including a pedestal, a leveling plate provided to the pedestal via leveling screws such that the leveling is enabled, and a prism unit including a prism having retroreflective characteristics. The prism unit is provided on the leveling plate, the prism unit retro-reflects a light beam entering from a vertically lower side by the prism, a lower through-hole through which a light beam which enters/is reflected to the prism penetrates is provided in the pedestal, and an attachment/detachment portion which enables the attachment/detachment of a predetermined measuring device is provided on an upper surface of the leveling plate.

17 Claims, 11 Drawing Sheets

(56) References Cited

U.S. PATENT DOCUMENTS

| | | | | |
|---|---|---|---|---|
| 11,536,567 B2* | 12/2022 | Yuasa | ................ | G01C 15/002 |
| 11,536,841 B2* | 12/2022 | Yasutomi | ................ | G01S 17/86 |
| 11,585,900 B2* | 2/2023 | Nishita | ................ | G01C 15/002 |
| 2020/0166340 A1 | 5/2020 | Hinderling | | |

FOREIGN PATENT DOCUMENTS

| | | |
|---|---|---|
| JP | 6-323856 A | 11/1994 |
| JP | 8-278135 A | 10/1996 |
| JP | 10-274528 A | 10/1998 |
| JP | 11-304488 A | 11/1999 |
| JP | 3008293 B2 | 2/2000 |
| JP | 2019-219319 A | 12/2019 |
| SG | 10201905418 | 1/2020 |

* cited by examiner

LEVELING BASE, SURVEYING INSTRUMENT AND SURVEYING SYSTEM

BACKGROUND OF THE INVENTION

The present invention relates to a leveling base for use in horizontally installing a surveying instrument or a device related to the surveying, a surveying instrument with the leveling base and a surveying system including the surveying instrument.

When measuring a reference point of an upper floor from a reference point of a lower floor in a structure, a through-hole (a marking hole), which is located vertically above the reference point of the lower floor, is first provided on the upper floor, and a vertical target device with a prism pointing downward is installed in the through-hole. Next, a laser beam is emitted vertically upward from a measuring instrument installed at the reference point of the lower floor, a reflected light from the prism is detected, the prism is measured, and the reference point of the lower floor is transferred to the upper floor based on a measurement result, or a position with respect to the reference point of the lower floor is made known.

Further, a surveying instrument is installed at a second reference point of the upper floor transferred from the reference point of the lower floor or at a second reference point of the upper floor known with respect to the reference point of the lower floor, and the upper floor is measured with reference to the second reference point by the surveying instrument. Alternatively, a horizontal target device is installed at the second reference point, and by measuring the horizontal target device, a position relative to the second reference point is measured.

Thus, a conventional type requires two processes which are a process of transferring the reference point to the upper floor or making the second reference point of the upper floor known and a process of installing the measuring device or the horizontal target device at the second reference point. Further, devices, e.g., a horizontal target device and a surveying device installed at the second reference point are required.

SUMMARY OF THE INVENTION

It is an object of the present invention to provide a simplification of the measurement work on the upper floor with reference to the lower floor and a simplification of a device.

To attain the object as described above, a leveling base according to the present invention includes a pedestal, a leveling plate provided to the pedestal via leveling screws, and a prism unit including a prism with retroreflective characteristics, wherein the prism unit is provided on the leveling plate, the prism unit retro-reflects a light beam entering from a vertically lower side by the prism, the pedestal having a lower through-hole which an incident light beam to the prism and a reflected light beam from the prism pass through, and an attachment/detachment portion, which is provided on an upper surface of the leveling plate, enables a measuring device to be attached to/to be detached from.

Further, in the leveling base according to a preferred embodiment, an upper through-hole which is concentric with the lower through-hole is provided in the leveling base, and the prism unit is configured to be attachable to and detachable from the upper through-hole from above.

Further, in the leveling base according to a preferred embodiment, a horizontal through-hole is provided in the leveling base from the horizontal direction, the prism unit is attachable to and detachable from the horizontal through-hole from the horizontal direction, and the prism is provided at a tip portion of the prism unit.

Further, in the leveling base according to a preferred embodiment, a horizontal through-hole is provided in the leveling base from the horizontal direction, the prism unit is attachable to and detachable from the horizontal through-hole from the horizontal direction, a deflecting optical component is provided at an inner end portion of the prism unit in which the deflecting optical component horizontally deflects a light beam entering from a vertically lower side, and the prism is provided at an outer end portion of the prism unit.

Further, in the leveling base according to a preferred embodiment, a horizontal through-hole is provided in the leveling base from the horizontal direction, a centripetal telescope which also serves as the prism unit is attachable to and detachable from the horizontal through-hole from the horizontal direction, the centripetal telescope has a deflecting optical component provided at an inner end portion and has a telescope opening at an outer end portion in which the deflecting optical component horizontally deflects a light beam entering from a vertically lower side, a beam splitter, which reflects a part of the light beam deflected by the deflecting optical component, is provided inside the centripetal telescope, and the prism is provided on a reflected optical axis of the beam splitter.

Further, in a surveying instrument according to a preferred embodiment, any of the above-described leveling bases, and a measuring device including a plug portion at a lower end portion, wherein the plug portion is configured to be coupled with and decoupled from the attachment/detachment portion and wherein a positional relationship between an optical center of the prism and a reference point O of the measuring device is known in a state where the leveling base is coupled with the measuring device.

Further, in the surveying instrument according to a preferred embodiment, the measuring device is a total station.

Further, in the surveying instrument according to a preferred embodiment, the measuring device is a laser scanner.

Further, in the surveying instrument according to a preferred embodiment, the measuring device is a GPS device.

Further, in the surveying instrument according to a preferred embodiment, the measuring device is a prism device.

Further, in the surveying instrument according to a preferred embodiment, the measuring device is a target device.

Further, in a surveying system according to a preferred embodiment, any of the above-described surveying instruments and a surveying instrument capable of measuring three-dimensional coordinates of an object located at a vertically upper side, wherein the surveying instrument capable of measuring the vertically upper side is installed at an original reference point on a lower floor as a reference surveying instrument, any of the surveying instruments is installed on an upper floor as a local surveying instrument, and three-dimensional coordinates of a prism included in the local surveying instrument are measured by the reference surveying instrument through a marking hole provided in a floor of the upper floor.

Furthermore, in the surveying system according to a preferred embodiment, a prism or an omnidirectional prism is provided at an upper end position of the local surveying instrument, and a positional relationship between an optical center of the prism or the omnidirectional prism and a reference point of the local surveying instrument is set known.

According to the present invention, a pedestal, a leveling plate provided to the pedestal via leveling screws, and a prism unit including a prism with retroreflective characteristics, wherein the prism unit is provided on the leveling plate, the prism unit retro-reflects a light beam entering from a vertically lower side by the prism, the pedestal having a lower through-hole which an incident light beam to the prism and a reflected light beam from the prism pass through, and an attachment detachment portion, which is provided on an upper surface of the leveling plate, enables a measuring device to be attached to/to be detached from. As a result, it is possible to readily make a reference optical axis of the prism as an object vertical by leveling the leveling plate, and it becomes easy to install the prism for transferring a reference point of a lower floor to an upper floor or for making a position relative to the reference point of the lower floor already known.

Further, since the necessary measuring device is capable of being arbitrarily mounted on the leveling base via the attachment/detachment portion, the general versatility of the leveling base increases, and the measuring device is capable of being simplified.

DETAILED DESCRIPTION OF THE PREFERRED EMBODIMENTS

A description will be given on an embodiment of the present invention by referring to the attached drawings.

Figure 1:
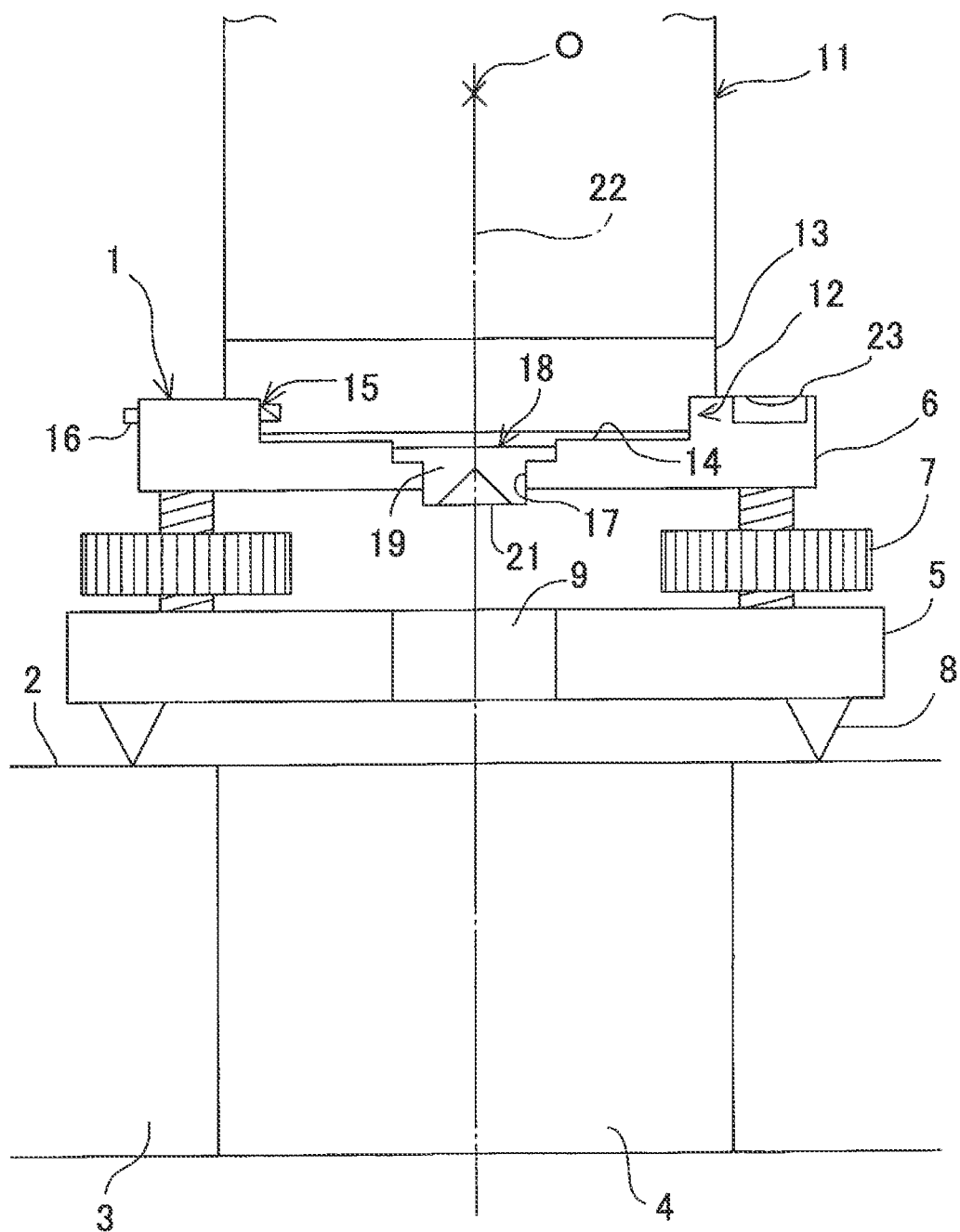
FIG. 1 is a schematic drawing of a leveling base according to an embodiment of the present invention.

FIG. 1 shows a leveling base 1 according to an embodiment of the present invention.

The leveling base 1 can be directly installed on a floor surface or an object, and can be installed on a supporting device such as a tripod. FIG. 1 shows a state where the leveling base is directly installed on a floor surface 2. In FIG. 1, a reference numeral 3 denotes a floor slab of an upper floor, and a reference numeral 4 denotes a through-hole (a marking hole) provided in the floor slab.

The leveling base 1 has a pedestal 5 and a leveling plate 6 arranged facing the pedestal 5, and the pedestal 5 and the leveling plate 6 are coupled to each other by three leveling screws 7. Each of the three leveling screws 7 is rotatable, and the rotation of the individual leveling screws 7 enables the adjustment of a distance between the pedestal 5 and the leveling plate 6, and enables the adjustment of a height of the leveling plate 6 relative to the pedestal 5 and the adjustment of a tilt relative to the pedestal 5.

The pedestal 5 has such a shape as the pedestal 5 is stably installed when installed on a flat surface, e.g., the floor surface 2 and the pedestal 5 becomes parallel to the flat surface. For example, protrusions 8 are provided at three positions on a lower surface of the pedestal 5. It is to be noted that the protrusions 8 can be omitted in a situation where the pedestal 5 can be directly installed on the floor surface 2.

A fixing portion (not shown) attachable to and detachable from the supporting device is formed on the lower surface of the pedestal 5, and a lower through-hole is formed at a central portion of the pedestal 5. The protrusions 8 are provided at positions where the protrusions 8 do not interfere with the supporting device.

On an upper surface of the leveling plate 6, an attachment/detachment portion 12 for mounting a measuring device 11 is formed. Further, a plug portion 13 which can be coupled to or decoupled from the attachment/detachment portion 12 is formed on a lower surface of the measuring device 11.

The attachment/detachment portion 12 has a fitted recess portion 14 which is a circular recess portion formed in a central portion of the leveling plate 6, and a lock portion 15 which can lock the plug portion 13 fitted in the fitted recess portion 14. The lock portion 15 has a claw 16 which is capable of engaging with and disengaging from the fitted recess portion 14 and, when the plug portion 13 is fitted in the fitted recess portion 14, the claw 16 is engaged with the plug portion 13, and the plug portion 13 is locked to the attachment/detachment portion 12. Disengaging the claw 16 from the plug portion 13 enables separating the measuring device 11 from the leveling plate 6.

An upper through-hole 17 is provided piercing a central portion of the fitted recess portion 14 of the leveling plate 6 concentrically with the lower through-hole 9. A prism unit 18 is detachably provided in the upper through-hole 17.

The prism unit 18 has a prism holder 19 as fitted into the upper through-hole 17 from above and a prism 21 as provided on a lower surface of the prism holder 19. The prism 21 has retroreflective characteristics and retroreflects a light beam coming from below. A reference optical axis of the prism 21 passes through an optical center of the prism 21, is perpendicular to the leveling plate 6 and coincides with a central line 22 running through the center of the leveling plate 6.

A tilt detector 23 is provided on the upper surface of the leveling plate 6 and is so designed that the tilt detector 23 is capable of confirming and detecting the horizontality when the leveling plate 6 is leveled up by the leveling screws 7. The tilt detector includes an air bubble tube, a tilt sensor, and the like.

As the measuring device 11, various kinds of devices such as a total station, a laser scanner, a transit, a GPS device, a prism and a target for images can be considered. Each measuring instrument 11 includes the common plug portion 13, respectively, and thereby each measuring instrument 11 is attachable to and detachable from the leveling plate 6 and to be replaceable depending on measurement situations. In a case where the measuring device 11 includes a tilt detector, the leveling can be performed using the tilt detector of the measuring device. In this case, the tilt detector of the leveling base may be omitted.

The measuring device 11 has a reference point O, which can be a reference for measuring. In a state where the measuring device 11 attached to the leveling plate 6, a central line of the measuring device 11 coincides with the central line 22, the reference point O is located on the central line 22, and a distance between the reference point O and the optical center of the prism 21 is known. It is to be noted that the reference point O does riot necessarily have to be on the central line, and the reference point O and the optical center could have a known positional relationship.

A description will be given on an operation of the leveling base 1 by referring to FIG. 2A and FIG. 2B. Further, the protrusions 8 are omitted in FIG. 2A and FIG. 2B.

Figure 2:
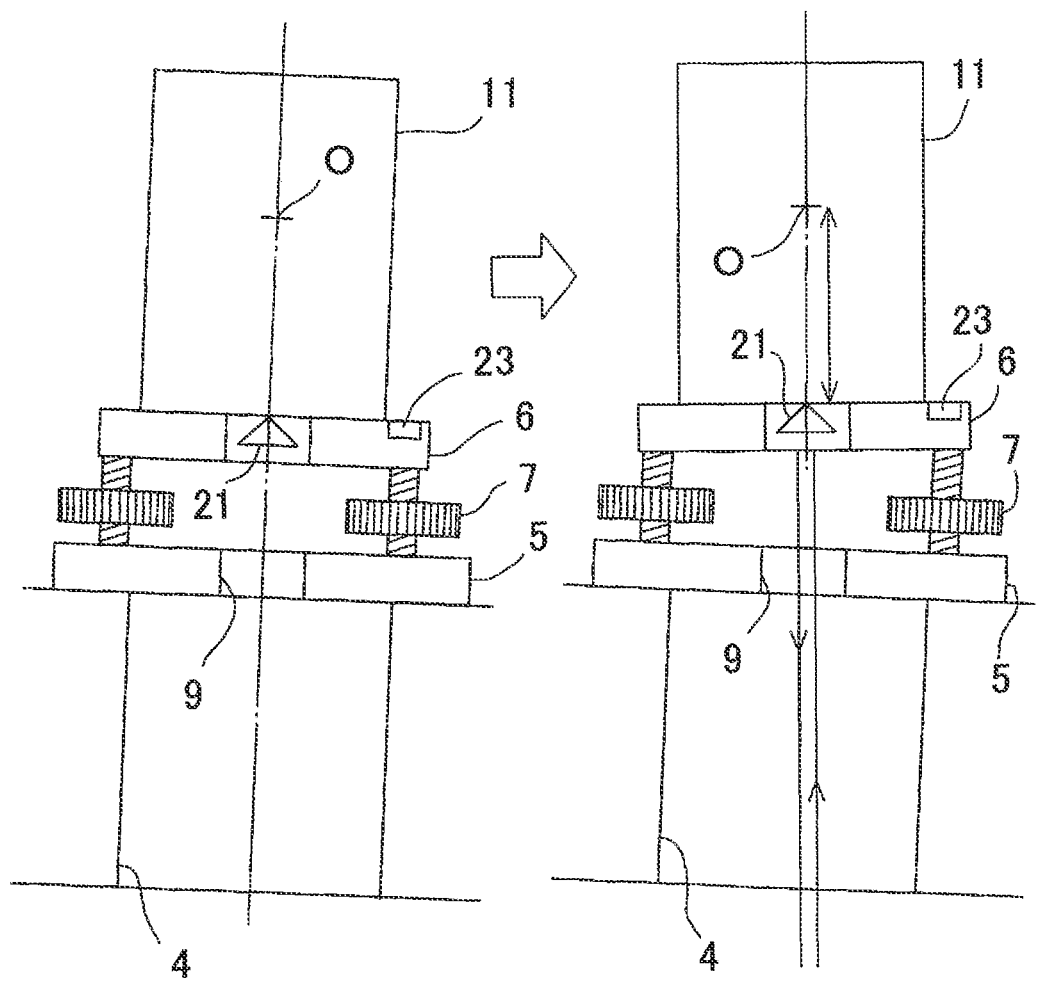
FIG. 2A and FIG. 2B are explanatory drawings of an operation of the leveling base.

FIG. 2A and FIG. 2B show a case where the leveling base 1 is installed on a tilted flow surface 2. Further, the measuring device 11 is provided on the leveling base 1. The reference point O of the measuring device 11 is located on the central line 22, and a distance between the reference point O and the optical center is known.

The leveling base 1 is installed on the floor surface in such a way that the center of the leveling base 1 substantially coincides with the center of the marking hole 4.

The tilt of the leveling plate 6 is corrected using the leveling screws 7, and the leveling plate 6 is horizontalized (leveled). Whether the leveling plate 6 has been leveled is confirmed by the tilt detector 23.

Since the measuring device 11 is integrated with the leveling plate 6, the leveling of the leveling plate 6 also causes the leveling of the measuring device 11. Further, since the measuring device 11 is integrated with the leveling plate 6, a distance between the reference point O and the optical center has no change, and the central line of the measuring device 11 is vertical.

A surveying instrument (not shown) is installed at a reference point on a lower floor (which will be referred to as an original reference point hereinafter). A distance measuring light is projected from a surveying instrument vertically upward, the distance measuring light irradiates the prism 21, the surveying instrument receives a reflected light from the prism 21, and the position measurement of the prism 21 is performed.

By measuring a position of the prism 21, a position (three-dimensional coordinates) of the reference point O is measured with respect to the original reference point. Hence, in a case where the measurement has been taken on an upper floor by the measuring device 11, this measurement result is with reference to the reference point O, and hence the measurement result of the upper floor can be converted into a measurement result (three-dimensional coordinates) with reference to the origin reference point.

By performing the measurement on each floor, it is possible to convert the measurement results of an entire structure into a measurement value with reference to the original reference point.

In the above description, the case where the measuring device 11 is installed on the leveling base 1 is described, but in a case where the reference point of the lower floor is transferred to the upper floor, the measuring device 11 may be omitted.

The leveling base 1 is installed at a position of the marking hole 4, and a position of the leveling base 1 (i.e., the center of the leveling base 1) is scribed on the floor surface 2. The scribed position is set as the reference point on the upper floor.

The position of the prism 21 is measured by the surveying instrument installed at the original reference point, the optical center of the prism 21 (i.e., the center of the measuring device 11) is measured by the surveying instrument, and three-dimensional coordinates of the optical center with respect to the original reference point are measured. By measuring the three-dimensional coordinates of the optical center, the reference point on the upper floor becomes known with respect to the origin reference point.

Various surveying instruments are installed on the upper floor and by measuring installing positions with respect to the reference point on the upper floor, the installing positions of the various surveying instruments on the upper floor become known with respect to the original reference point. Therefore, measurement results of performing the measurement by the various measuring instruments can be converted into a measurement value with reference to the original reference point.

It is to be noted that, in case of precisely transferring the original reference point of the lower floor to the upper floor, a method for tracing a reference point disclosed in Japanese Patent Application Publication No. 2019-219319 can be implemented using the leveling base 1.

As an application example of this embodiment, the leveling base 1 may also be used without the prism unit 18.

Some of the surveying instruments apply a guide light indicative of a surveying instrument installing position vertically downward for installing the measuring device at a reference position. An optical axis of this guide light is configured to run through a reference point O of the surveying instrument and coincides with the reference optical axis of the prism 21.

Hence, in a state where the prism unit 18 is removed, the guide light passes through the upper through-hole 17 and the lower through-hole 9, irradiates a surface on which the surveying instrument has been installed, and indicates a position where the surveying instrument has been installed.

If the guide light is not applied vertically downward, the prism unit 18 may be fixedly provided.

As described above, the plug portion 13 can be coupled to and uncoupled from the attachment/detachment portion 12 of the leveling plate 6. Therefore, by providing the plug portion 13 common to various kinds of measuring devices 11, different measuring devices 11 are able to be mounted on the leveling base 1.

Figure 3:
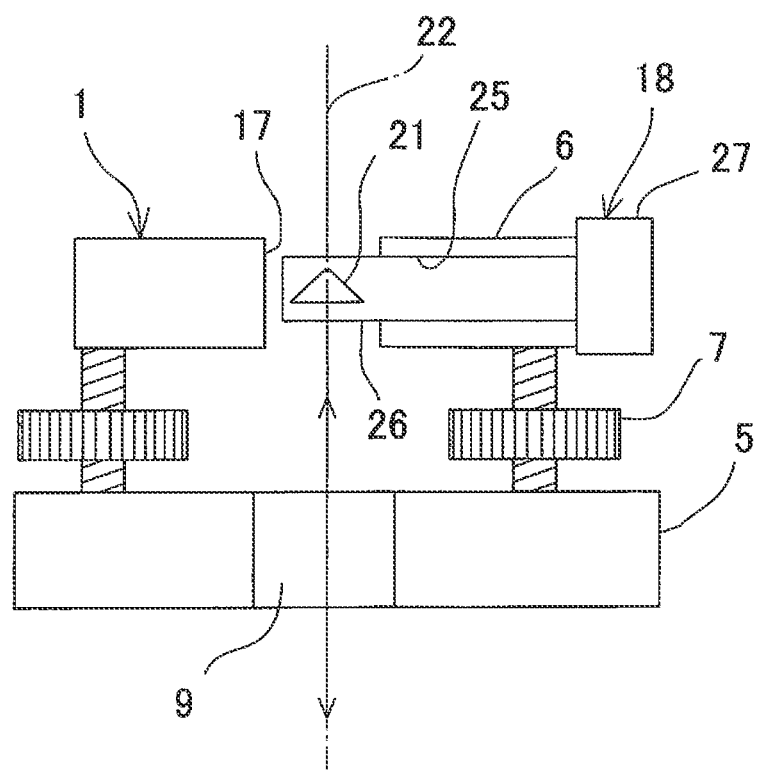
FIG. 3 is a schematic drawing of a second embodiment.

FIG. 3 shows a second embodiment, and in the second embodiment, a prism unit 18 is attachable to and detachable from the leveling plate 6 from the horizontal direction in FIG. 3, the equivalent components as shown in FIG. 1 are referred by the same symbols.

In the leveling plate 6, a horizontal through-hole 25 penetrating from a side surface to an upper through-hole 17 is formed. A prism unit 18 is inserted and mounted in the horizontal through-hole 25 from the horizontal direction.

The prism unit 18 has a rod-shaped prism holder 26 and a prism 21 which is provided at a tip of the prism holder 26. With the prism unit 18 mounted, a reference optical axis of the prism 21 coincides with a central line 22 and the prism 21 retro-reflects a light from below. The prism holder 26 is a solid or hollow member, a base portion thereof is exposed from the leveling plate 6, has a large diameter, and serves as a knob 27 when attaching or detaching the protrusions 8.

The prism unit 18 is attachable to and detachable from the leveling plate 6. As the horizontal through-hole 25, a hole provided for mounting a centripetal telescope (which will be described later) may be utilized.

By making the prism unit 18 attachable and detachable from communalized the horizontal direction, it is possible to set the prism 21 to the leveling base 1 in a state where the measuring device 11 is mounted on the leveling base 1.

Next, as disclosed in Japanese Patent Publication No. 3008293, some of the measuring devices include a centripetal telescope.

The centripetal telescope is a telescope which has an optical axis coinciding with the central line 22 of the surveying instrument and enables visually conforming an installing position of the surveying instrument.

Figure 4:
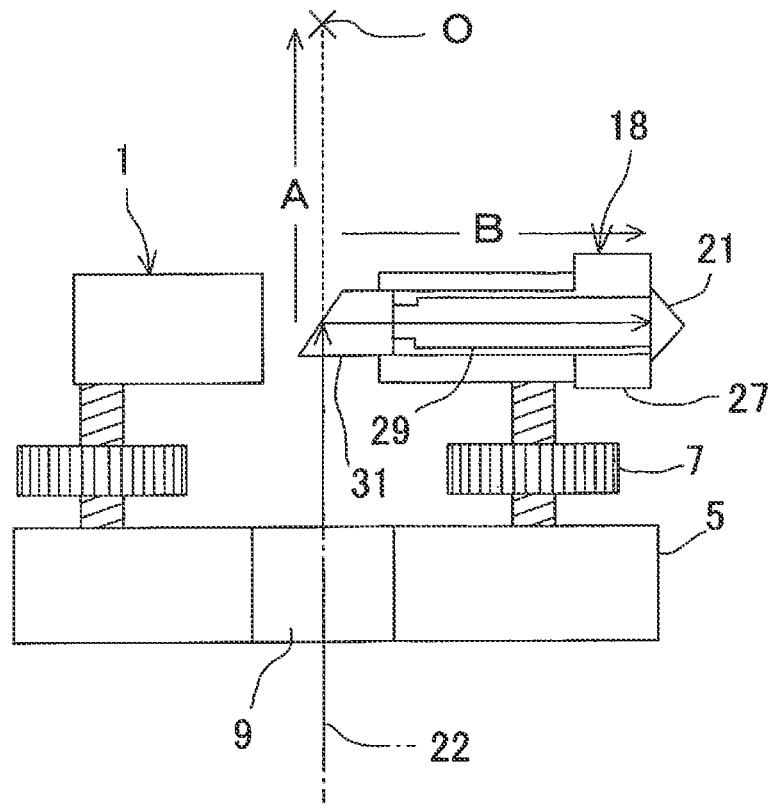
FIG. 4 is a schematic drawing of a third embodiment.

FIG. 4 shows a third embodiment. In the third embodiment as described below, the centripetal telescope (not shown) is provided on a leveling base 1, especially a leveling plate 6.

A horizontal through-hole 25 is formed in the leveling plate 6, and the centripetal telescope is mounted to the leveling plate 6 when being inserted into the horizontal through-hole 25. Further, the centripetal telescope is attachable to and detachable from the leveling plate 6 from the horizontal direction.

A prism unit 18 is mounted using the horizontal through-hole 25 after removing the centripetal telescope.

A prism holder 29 of the prism. unit 16 has the same shape as that of a body tube of the centripetal telescope, which is a hollow shape.

A deflecting optical component (e.g., a mirror or a prism) 31 is provided at an inner end portion of the prism holder 29. The deflecting optical component 31 deflects a light beam, which enters along the central line 22 from a vertically lower side, in an axial direction (the horizontal direction) of the prism holder 29.

A prism 21 is provided at an outer end portion of the prism holder 29. In FIG. 4, the prism 21 is exposed from the prism holder 29, but the prism 21 may be provided in the prism holder 29.

A distance A between a reflecting surface of the deflecting optical component 31 and a reference point O (see FIG. 1), and a distance B between the reflecting surface of the deflecting optical component 31 and an optical center of the prism 21 are set equal. It is to be noted that, if these distances cannot be set equal, a value of (A-B) is made known.

In the third embodiment, since the distance A and the distance B are equal, a result of measuring the prism 21 from the lower side is equal to a result of measuring the reference point O. Therefore, by measuring the prism 21, it become possible to immediately make coordinates of the reference point O known.

Figure 5:
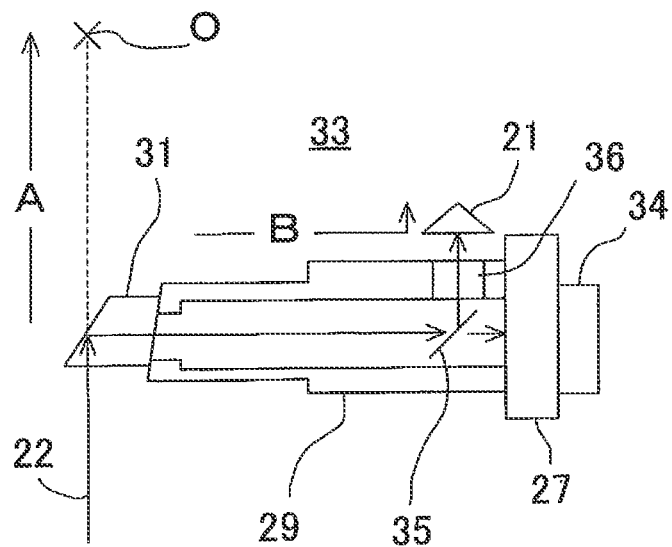
FIG. 5 is a schematic drawing of a fourth embodiment.

FIG. 5 shows a fourth embodiment.

In the fourth embodiment, a prism 21 is added to a centripetal telescope 33, and the centripetal telescope 33 is configured to also function as a prism unit 18.

FIG. 5 shows the centripetal telescope 33 alone, and optical components of the centripetal telescope 33 are omitted. In FIG. 5, the equivalent components as shown in FIG. 4 are referred by the same symbols.

A telescope opening 34 is provided at an outer end of a prism holder 29.

A beam splitter 35 is provided on an axis of the prism holder 29. The beam splitter 35 reflects upward a part of a light which enters along the axis of the prism holder 29 and transmits a remaining part. A passage hole 36 is provided in a portion of the prism holder 29 through which a reflected optical axis of the beam splitter 35 passes, and a prism 21 is provided on a reflected optical axis passing through the passage hole 36. As the beam. splitter 35, an optical component such as a half mirror or a prism having a partially-transmissive reflective film formed thereon is used.

In the fourth embodiment, likewise, a distance A between a reflecting surface of the deflecting optical component 31 and a reference point O and a distance B between the reflecting surface of the deflecting optical component 31 and an optical center of the prism 21 are set equal. Alternatively, a value of (A-B) is made known.

A light from below is reflected by the prism 21, and a surveying instrument (not shown) receives the reflected light and is able to measure a position of the prism 21. A measurement result of the prism 21 becomes equal to a result of measuring the reference point O, and by measuring the prism 21, it become possible to immediately make coordinates of the reference point O known.

When a measuring device 11 is installed, since the light from below is transmitted through the beam splitter 35, a worker can confirm an installing position and an installing state of the measuring device 11 via the telescope opening 34.

In the foregoing embodiment, the description has been given on a state where a leveling base 1 is directly installed on a floor surface 2 but, needless to say, the measurement can be likewise performed even if the leveling base 1 is installed on a supporting device such as a tripod.

The leveling base 1 has an attachment/detachment portion 12, a plug portion 13 is configured so that the plug portion 13 can be coupled to and decoupled from the attachment/detachment portion 12. Hence, when providing the commonalized plug portion 13 to each of various kinds of surveying instrument or optical devices, it is possible to select an appropriate one from the various kinds of surveying instruments or optical devices and to mount it on one leveling base 1 in corresponding with a work state.

Alternatively, a plurality of leveling bases 1 may be prepared, an appropriate combination of the various kinds of surveying instruments or optical devices may be selected and mounted, and the work may be performed.

Figure 6:
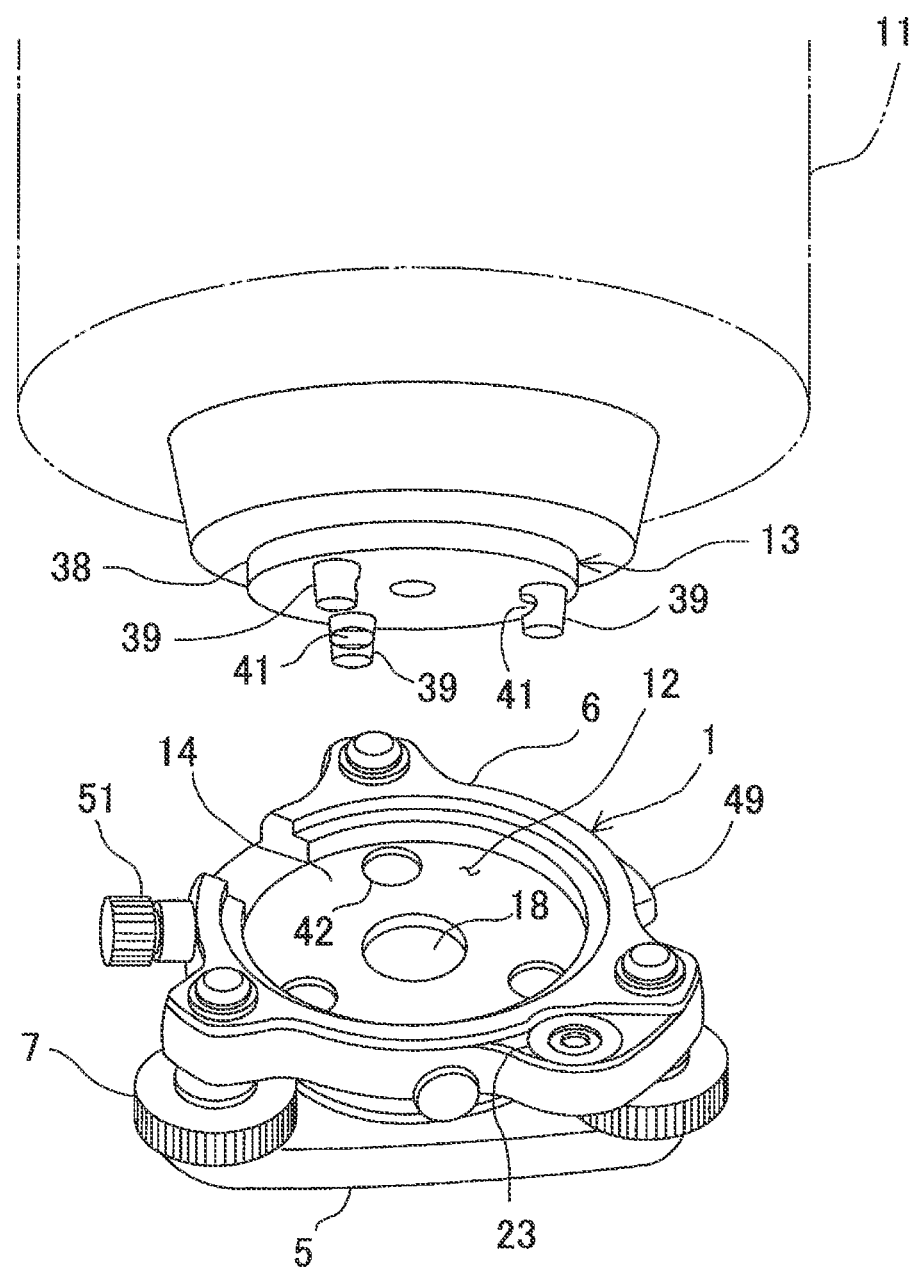
FIG. 6 is a perspective view showing an example of a configuration of an attachment/detachment portion and a plug portion according to this embodiment.
Figure 7:
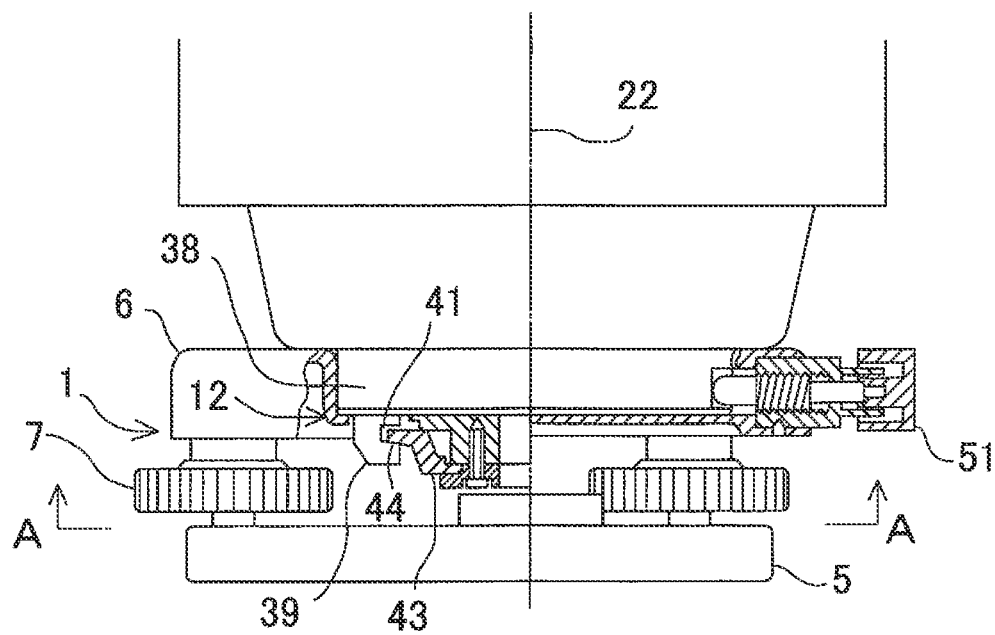
FIG. 7 is a side elevation showing a configuration of the attachment/detachment portion and the plug portion.
Figure 8:
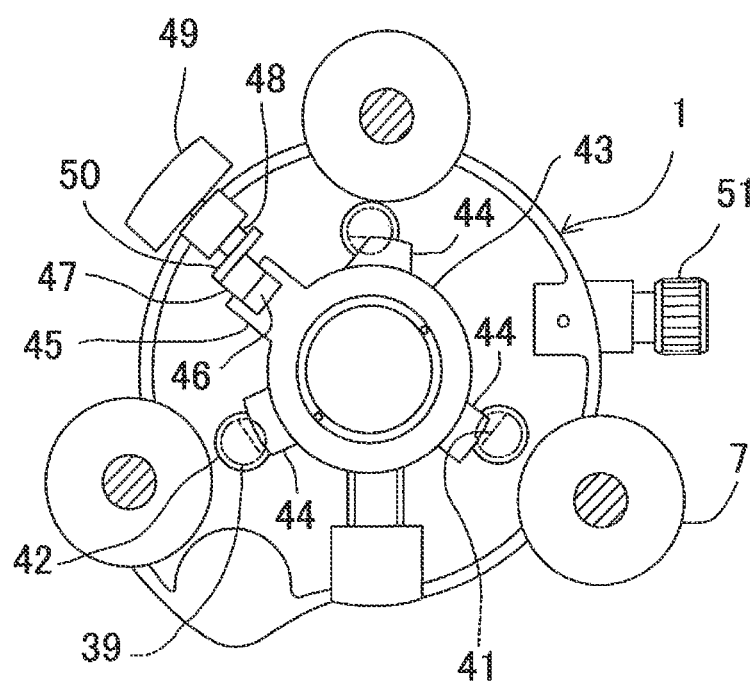
FIG. 8 is an A-A arrow view of FIG. 7.

An example of structures of the attachment/detachment portion 12 and the plug portion 13 which are commonalized will be described with reference to FIG. 6 to FIG. 8. In FIG. 6 to FIG. 8, equivalent components as shown in FIG. 1 are referred by the same symbols. FIG. 8 shows an A-A arrow view of FIG. 7.

First, a description will be given on the plug portion 13 provided to the measuring device 11 in common.

The plug portion 13 has a fitted projecting portion 38 formed at a lower end thereof concentrically with the central line 22, and three protrusions 39 are provided on a bottom surface of the fitted projecting portion 38. The protrusions 39 are provided on the same circumference and at positions trisecting the circumference, and an engagement groove 41 is formed on a central side of each of the protrusions 39.

Next, a description will be given on the attachment/detachment portion 12 as provided on the leveling base 1.

A fitted recess portion 14 is formed on an upper surface of the leveling plate 6 concentrically with the central line 22. The fitted recess portion 14 is formed in such a manner that the fitted projecting portions 38 can be smoothly fitted therein without the backlash. An upper through-hole 17 is formed in a central portion of the fitted recess portion 14, and the prism unit 18 is attachable to and detachable from the upper through-hole 17.

Three engagement holes 42 are formed in a bottom surface of the fitted recess portion 14. The engagement holes 42 are provided on a circumference with the same diameter as the circumference on which the protrusions 39 are provided, and the three engagement holes 42 are provided at positions trisecting the circumference.

In the case where a direction of the measuring device 11 is determined relative to the leveling base 1, positions of the protrusion 39 relative to the engagement holes 42 are set in such a manner that the measuring device 11 faces a predetermined direction.

A lock plate 43 is provided on a lower surface of the fitted recess portion 14 in such a manner that the lock plate 43 can rotate around the central line 22. Encasement pieces 44 are formed to the lock plate 43 at positions trisecting the circumference in such a manner that the engagement pieces 44 protrude outward. Further, a lever receiver 45 is provided between the engagement pieces 44, 44 of the lock plate 43. The lever receiver 45 has a recess groove 46 which is opened outward, and a piece 47, as described later, fits in the recess groove 46.

A lever shaft 48 piecing through an outer peripheral wall of the leveling plate 6 is rotatably provided. A knob 49 is fixed at an outer end of the lever shaft 48, a lock lever 50 is fixed at an inner end of the lever shaft 48, and the piece 47 is rotatably provided at a tip of the lock lever 50.

Thus, when the knob 49 is rotated, the lock lever 50 rotates via the lever shaft 48. The piece 47 displaces the recess groove 46 in the circumferential direction by the rotation of the lock lever 50, and the lock plate 43 rotates via the recess groove 46.

Tips of the engagement pieces 44 overlap the engagement holes 42 by the rotation of the lock plate 43, respectively.

In case of mounting the measuring device 11 on the leveling base 1, the engagement pieces 44 are retracted from the engagement holes 42, the fitted projecting portion 38 is fitted in the fitted recess portion 14 and the protrusions 39 are fitted in the engagement holes 42.

Then, the knob 49 is rotated and the lock plate 43 is rotated, thereby the engagement pieces 44 engages with the engagement grooves 41. The attachment/detachment portion 12 and the plug portion 13 are coupled by engaging of the engagement pieces 44 with the engagement grooves 41.

In order to fix a coupling between the attachment/detachment portion 12 and the plug portion 13 or to suppress backlash, a lock bolt 51 is provided. A tip of the lock bolt 51 is fitted on the fitted projecting portion 38 or presses the fitted projecting portion 38 by being screwed, and the backlash between the attachment/detachment portion 12 and the plug portion 13 is suppressed.

As describe above, by providing the plug portion 13 formed of the fitted projecting portion 38 and the protrusions 39 to the measuring device 11, it is possible to mount the measuring device 11 on the leveling base 1.

In a state where the measuring device 11 is mounted on the leveling base 1, a surveying instrument is configured to have predetermined measuring functions and to be capable of installing independently.

A measuring device 11 which includes the plug portion 13 and is capable of being mounted on the leveling base 1 will be exemplified hereinafter.

Figure 9:
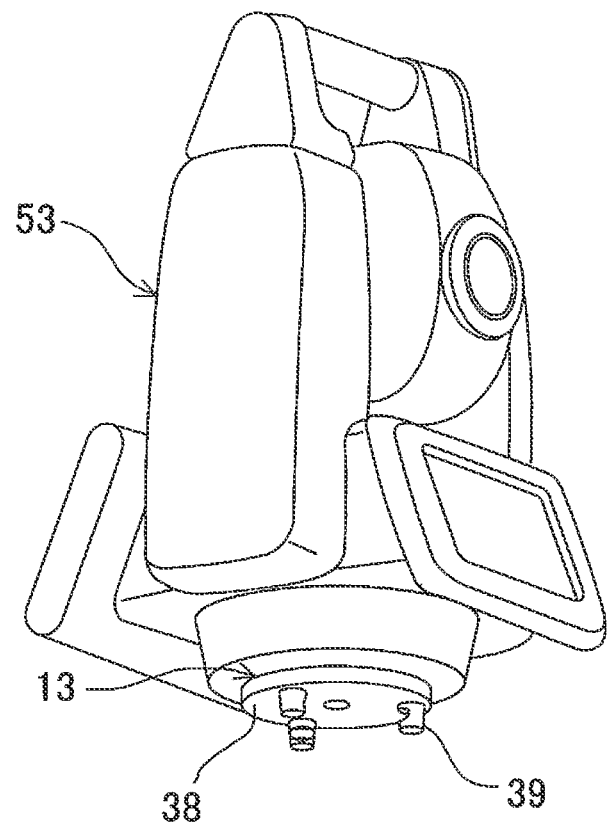
FIG. 9 is a perspective view of a total station having a commonalized plug portion.

FIG. 9 shows a total station 53 as the measuring device 11. The total station 53 has the above-described plug portion 13 at a lower end portion thereof.

When the plug portion 13 is coupled to the attachment/detachment portion 12, the total station 53 is mounted on the leveling base 1. The total station 53 has been illustrated as a surveying instrument, but even a surveying instrument such as a laser scanner can be likewise mounted on the leveling base 1 if the plug portion 13 is provided at a lower end portion thereof.

Figure 10:
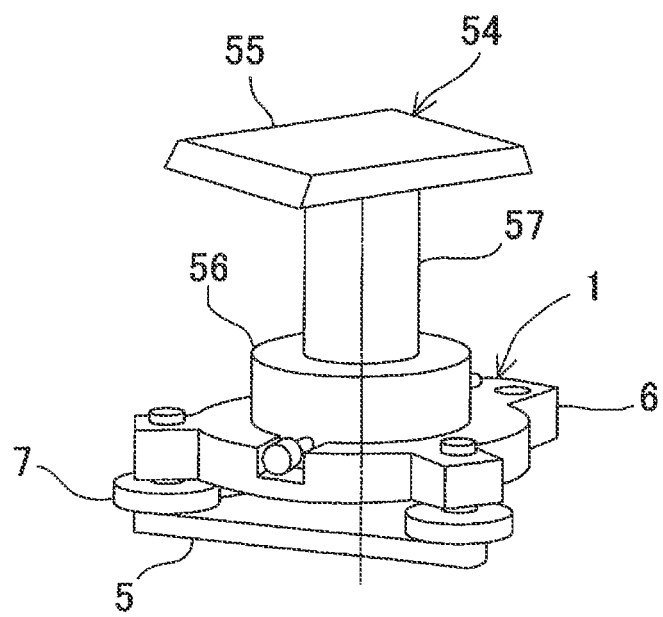
FIG. 10 is a perspective view of a GPS device integrated with a leveling base via the commonalized plug portion.

FIG. 10 shows a GPS device 54 as the measuring device 11. FIG. 10 shows a state where the GPS device 54 is mounted on the leveling base 1.

The GPS device 54 has a GPS antenna 55, and the GPS antenna 55 is supported by a pedestal 56 via a column 57. The above-described plug portion 13 (not shown) is provided on a lower surface of the pedestal 56. in the GPS device 54, likewise, when the plug portion 13 is coupled to the attachment/detachment portion 12 of the leveling base 1, the GPS device 54 is mounted on the leveling base 1.

In a state where the GPS device 54 is mounted on the leveling base 1, a positional relationship between a reference point of the GPS device 54 (a point measured by the GPS device 54) and an optical center of the leveling base 1 is known.

Figure 11:
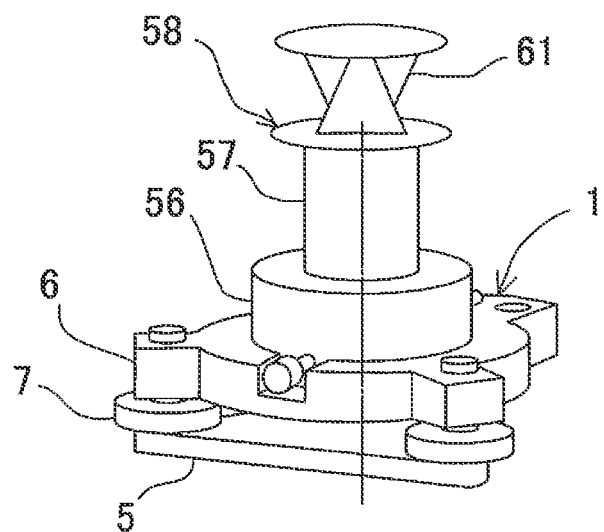
FIG. 11 is a perspective view of a prism device integrated with the leveling based via the commonalized plug portion.

FIG. 11 shows a prism device 58 as the measuring device 11. FIG. 11 shows a state where the prism device 58 is mounted on the leveling base 1.

The prism device 58 has an omnidirectional prism 61, and the omnidirectional prism 61 is supported by the pedestal 56 via the column 57. The above-described plug portion 13 (not shown) is provided on a lower surface of the pedestal 56, and the prism device 58 is mounted on the leveling base 1 via the plug portion 13.

A positional relationship between an optical center of the omnidirectional prism 61 and an optical center of a prism of the leveling base 1 is known.

Figure 12:
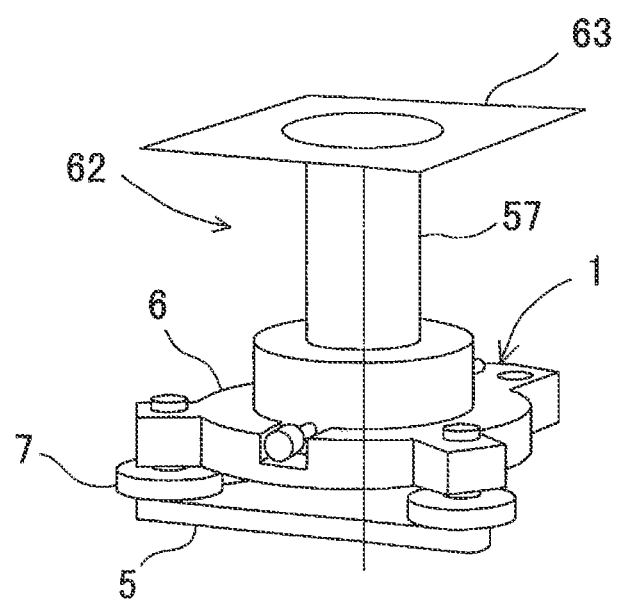
FIG. 12 is a perspective view of a target device integrated with the leveling base via the commonalized plug portion.

FIG. 12 shows a target device 62 as the measuring device 11. FIG. 12 shows a state where the target device 62 is mounted on the leveling base 1.

The target device 62 has a target plate 63, and the target plate 63 is supported by the pedestal 56 via the column 57. The above-described plug portion 13 (not shown) is provided on a lower surface of the pedestal 56, and the target device 62 is mounted on the leveling base 1 via the plug portion 13.

A positional relationship between a reference position of the target plate 63 and the optical center of the prism of the leveling base 1 is known.

Needless to say, the measuring device 11 mounted on the leveling base 1 is not restricted to the above-described devices.

Figure 13:
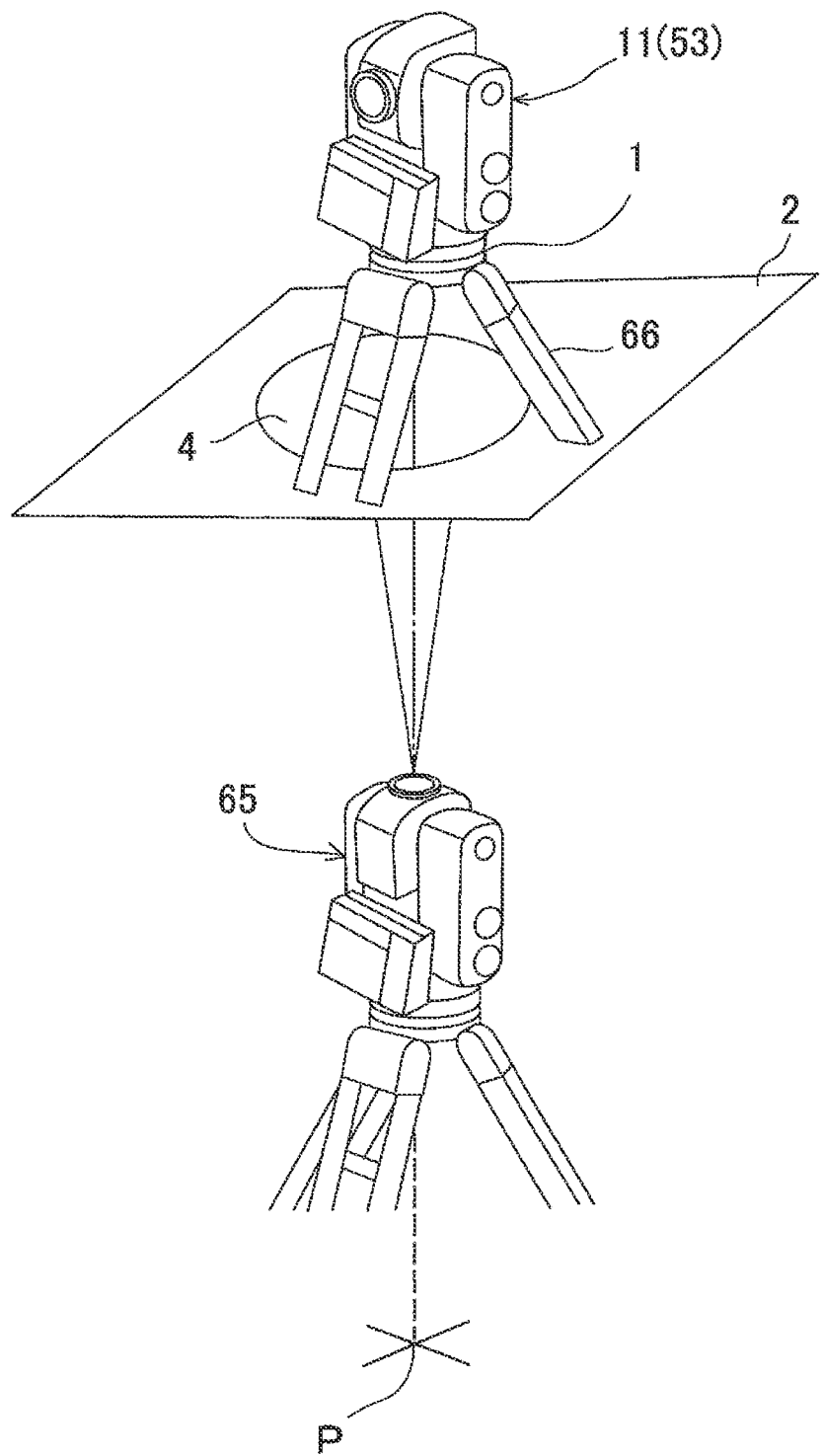
FIG. 13 as a perspective view of a surveying system according to an embodiment of the present invention.

FIG. 13 shows a surveying system according to this embodiment, and shows a surveying system including a measuring device 11 provided with the leveling base 1 and the plug portion 13.

In an embodiment shown in FIG. 13, a total station 53 is used as the measuring device 11.

An original reference point P is set on a floor surface of a lower floor, and a surveying instrument 65 is installed at the original reference point. The surveying instrument 65 may be a surveying instrument which is capable of measuring three-dimensional coordinates of an object present on a vertically upper side can suffice, and FIG. 13 shows a total station as an example of the surveying instrument. The surveying instrument 65 measures three-dimensional coordinates of an object with the original reference point P as a reference, and functions as a reference surveying instrument.

The surveying instrument 65 measures the object through a marking hole 4 provided on a floor surface 2 of an upper floor.

The total station 53 is provided above the marking hole 4. The total station 53 is installed on the floor surface 2 of the upper floor via a tripod 66, and an installing position is determined in such a manner that a reference point of the total station 53 substantially coincides with a center of the marking hole 4.

A leveling base 1 is mounted on the tripod 66, and the total station 53 is installed on the leveling base 1. The total station 53 is leveled integrally with the leveling plate 6 by the leveling base 1. The total station 53 functions as a local surveying instrument which is provided at a position away from the original reference point P.

A prism 21 included in the leveling base 1 is measured by the surveying instrument 65, and three-dimensional coordinates of an optical center of the prism 21 are acquired (see FIG. 1). Since a reference point O of the total station 53 is located on a vertical line running through the optical center of the prism 21 and a distance between the reference point O and the optical center of the prism 21 is known, three-dimensional coordinates of the reference point O with reference to the original reference point P can be acquired.

Subsequently, the measurement of an upper floor is performed by the total station 53. The measurement is performed with respect to a post, a wall surface, an opening portion, a floor, a beam, an interior material, a building frame such as a reinforcing bar, a building component concerning a bacility, and the like, and measurement values with reference to the reference point O of the total station 53 are acquired.

A three-dimensional coordinate value of the reference point O with reference to the original point P is known and, based on the three-dimensional coordinate value, measurement values of the upper floor acquired by the measurement using the total station 53 are able to be converted into a three-dimensional coordinate value with reference to the original reference point P.

When the same measurements are performed to other upper floors three-dimensional coordinate values with reference to the original reference point P on all floors of a building.

It is to be noted that the surveying instrument includes a laser scanner, a transit, a GPS device, a level, a laser marker, and the like as well as the total station 53.

Figure 14:
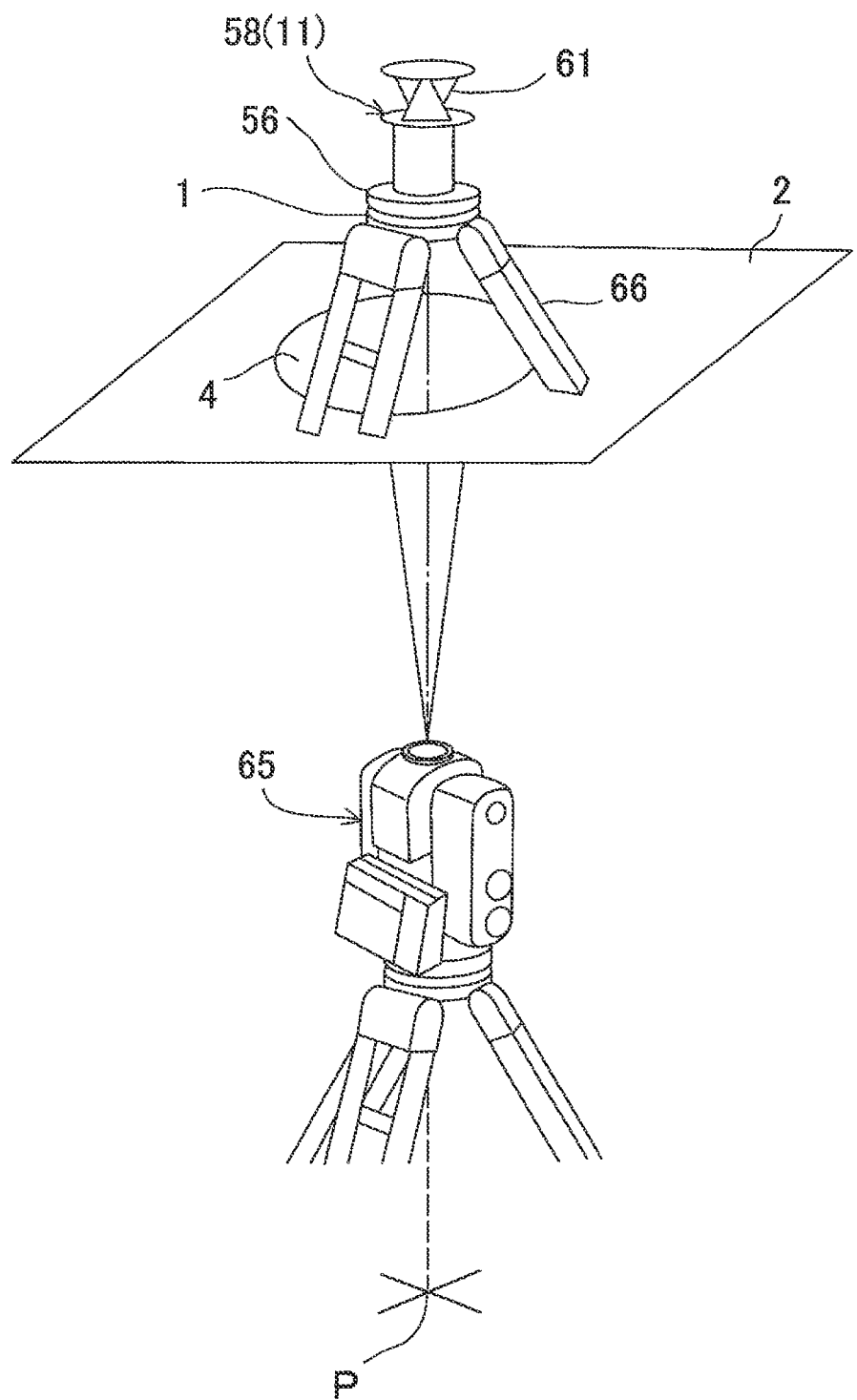
FIG. 14 is a schematic view of a surveying system according another embodiment of the present invention.

In an embodiment shown in FIG. 14, a prism device 58 is used as the measuring device 11.

The prism device 58 is mounted on a tripod 66 via a leveling base 1. The prism device 58 is leveled by the leveling base 1.

A prism 21 included in the leveling base 1 is measured by the surveying instrument 65 on a lower floor, and three-dimensional coordinates of an optical center of the prism 21 are acquired. Three-dimensional coordinates of an optical center of an omnidirectional prism 61 of the prism device 58 are known with reference to the original reference point P.

When the omnidirectional prism 61 is measured by a measuring instrument as installed on an upper floor, an installing position of the measuring instrument is known with reference to the omnidirectional prism 61. Further, the installing position of the measuring instrument becomes known with reference to the original reference point P, and a measurement result on the upper floor can be converted into a measurement result with reference Co the original reference point P.

Needless to say, any other measuring device 11 including the leveling base 1, e.g., the GPS device 54 or the target plate 63 likewise capable of being measured by surveying instrument 65 on a lower layer, and three-dimensional coordinates thereof with reference to the original reference point P can be acquired.

Figure 15:
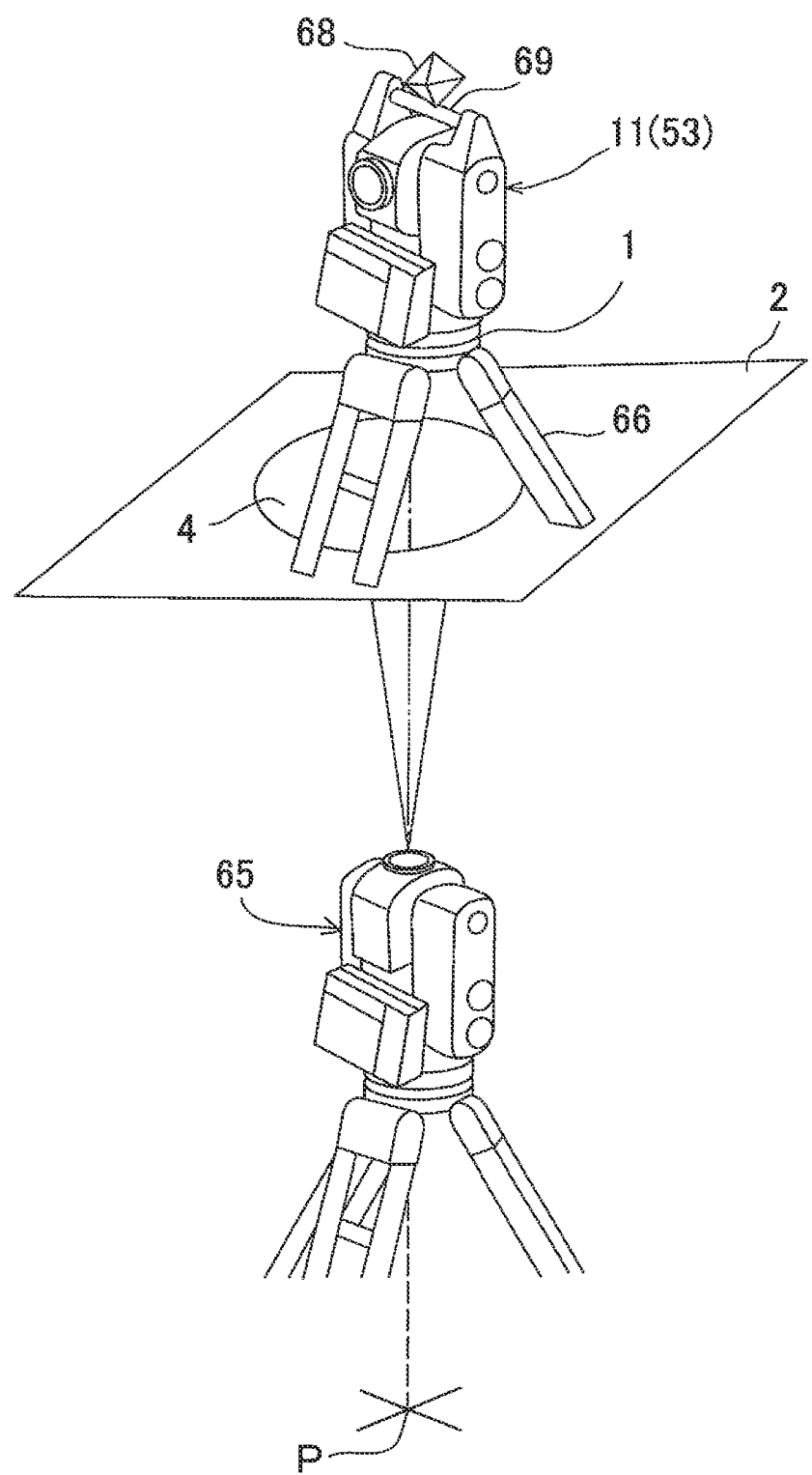
FIG. 15 is a schematic diagram of a surveying system according to still another embodiment of the present invention.

An embodiment shown in FIG. 15 illustrates a case where an omnidirectional prism 68 is provided at a required position of the total station 53 shown in FIG. 13.

A position at which the omnidirectional prism 68 is provided is an upper end of a frame unit of the total station 53. Alternatively, as shown in FIG. 15, in a case where a handle 69 is provided, the omnidirectional prism 68 may be provided to the handle 69. In short, the omnidirectional prism 68 is provided at an upper end position of the total station 53 and it is essential only that a light is capable of entering from all directions or substantially all direction and of being retro-reflected.

Further, an optical center of the omnidirectional prism 68 and the reference point O of the total station 53 have a known positional relationship.

The total station 53 is installed, and the prism 21 (not shown, see FIG. 1) provided on the total station 53 is measured by the surveying instrument 65. The reference point O is made known with respect to the reference point P based on the relationship between the prism 21 and the reference point O of the surveying instrument 65, and three-dimensional coordinates of the optical center of the omnidirectional prism 68 are made known with reference to the original reference point P based on the positional relationship between the reference point O and the optical center of the omnidirectional prism 68.

Therefore, by measuring the omnidirectional prism 68 by any other measuring instrument than the total station 53, as installed on an upper floor, an installing position of the other measuring instrument becomes known with reference to the omnidirectional prism 68, and a measurement result of the other measuring instrument is capable of being converted into a measurement result with reference to the original reference point P.

It is to be noted that the omnidirectional prism may be a prism, and the surveying instrument the omnidirectional prism 68 provided thereon includes various kinds of surveying instruments, e.g., a laser scanner, a transit, a GPS device, a level, a laser marker, and the like as well as the total station 53.

The invention claimed is:

1. A leveling base comprising a pedestal, a leveling plate provided to said pedestal via leveling screws, and a prism unit including a prism with retroreflective characteristics, wherein said prism unit is provided on said leveling plate, said prism unit retro-reflects a light beam entering from a vertically lower side by said prism, said pedestal having a lower through-hole which an incident light beam to said prism and a reflected light beam from said prism pass through, and an attachment/detachment portion, which is provided on an upper surface of said leveling plate, enables a measuring device to be attached to/to be detached from.

2. The leveling base according to claim 1, wherein an upper through-hole which is concentric with said lower through-hole is provided in said leveling base, and said prism unit is configured to be attachable to and detachable from said upper through-hole from above.

3. A surveying instrument comprising: a leveling base according to claim 2 and a measuring device including a plug portion at a lower end portion, wherein said plug portion is configured to be coupled with and decoupled from said attachment/detachment portion and wherein a positional relationship between an optical center of said prism and a reference point O of said measuring device is known in a state where said leveling base is coupled with said measuring device.

4. The leveling base according to claim 1, wherein a horizontal through-hole is provided in said leveling base from the horizontal direction, said prism unit is attachable to and detachable from said horizontal through-hole from the horizontal direction, and said prism is provided at a tip portion of said prism unit.

5. A surveying instrument comprising: a leveling base according to claim 4 and a measuring device including a plug portion at a lower end portion, wherein said plug portion is configured to be coupled with and decoupled from said attachment/detachment portion and wherein a positional relationship between an optical center of said prism and a reference point O of said measuring device is known in a state where said leveling base is coupled with said measuring device.

6. The leveling base according to claim 1, wherein a horizontal through-hole is provided in said leveling base from the horizontal direction, said prism unit is attachable to and detachable from said horizontal through-hole from the horizontal direction, a deflecting optical component is provided at an inner end portion of said prism unit in which said deflecting optical component horizontally deflects a light beam entering from a vertically lower side, and said prism is provided at an outer end portion of said prism unit.

7. A surveying instrument comprising: a leveling base according to claim 6 and a measuring device including a plug portion at a lower end portion, wherein said plug portion is configured to be coupled with and decoupled from said attachment/detachment portion and wherein a positional relationship between an optical center of said prism and a reference point O of said measuring device is known in a state where said leveling base is coupled with said measuring device.

8. The leveling base according to claim 1, wherein a horizontal through-hole is provided in said leveling base from the horizontal direction, a centripetal telescope which also serves as said prism unit is attachable to and detachable from said horizontal through-hole from the horizontal direction, said centripetal telescope has a deflecting optical component provided at an inner end portion and has a telescope opening at an outer end portion in which said deflecting optical component horizontally deflects a light beam entering from a vertically lower side, a beam splitter, which reflects a part of said light beam deflected by said deflecting optical component, is provided inside said centripetal telescope, and said prism is provided on a reflected optical axis of said beam splitter.

9. A surveying instrument comprising: a leveling base according to claim 8 and a measuring device including a plug portion at a lower end portion, wherein said plug portion is configured to be coupled with and decoupled from said attachment/detachment portion and wherein a positional relationship between an optical center of said prism and a reference point O of said measuring device is known in a state where said leveling base is coupled with said measuring device.

10. A surveying instrument comprising: a leveling base according to claim 1 and a measuring device including a plug portion at a lower end portion, wherein said plug portion is configured to be coupled with and decoupled from said attachment/detachment portion and wherein a positional relationship between an optical center of said prism and a reference point O of said measuring device is known in a state where said leveling base is coupled with said measuring device.

11. The surveying instrument according to claim 10, wherein said measuring device is a total station.

12. The surveying instrument according to claim 10, wherein said measuring device is a laser scanner.

13. The surveying instrument according to claim 10, wherein said measuring device is a GPS device.

14. The surveying instrument according to claim 10, wherein said measuring device is a prism device.

15. The surveying instrument according to claim 10, wherein said measuring device is a target device.

16. A surveying system comprising: surveying instruments according to claim 10 and a surveying instrument capable of measuring three-dimensional coordinates of an object located at a vertically upper side, wherein said surveying instrument capable of measuring the vertically upper side is installed at an original reference point on a lower floor as a reference surveying instrument, any of said surveying instruments is installed on an upper floor as a local surveying instrument, and three-dimensional coordinates of a prism included in said local surveying instrument are measured by said reference surveying instrument through a marking hole provided in a floor of said upper floor.

17. The surveying system according to claim 16, wherein a prism or an omnidirectional prism is provided at an upper end position of said local surveying instrument, and a positional relationship between an optical center of said prism or said omnidirectional prism and a reference point of said local surveying instrument is set known.

* * * * *